Figure 1:
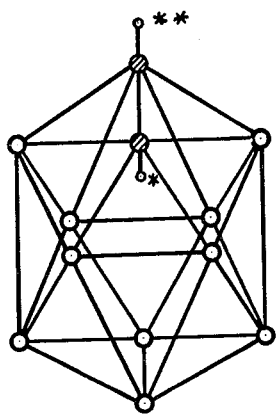

Oct. 13, 1964  J. W. AGER, JR., ET AL  3,153,056
ORGANOBORON CYCLIC ETHERS
Filed Dec. 1, 1961

○ BORON

⊘ CARBON

∘ HYDROGEN ON CARBON
(HYDROGEN ATOMS ON BORON
OMITTED FOR CLARITY

FORMULA I

INVENTORS.
JOHN W. AGER, JR.
BY THEODORE L. HEYING

Walter D. Hunter
AGENT

3,153,056
ORGANOBORON CYCLIC ETHERS

John W. Ager, Jr., Princeton, N.J., and Theodore L. Heying, North Haven, Conn., assignors to Olin Mathieson Chemical Corporation, a corporation of Virginia
Filed Dec. 1, 1961, Ser. No. 157,304
2 Claims. (Cl. 260—346.1)

This invention relates to organoboron cyclic ethers and to a method for their preparation. The organoboron cyclic ethers are prepared by the dehydration of organoboron alcohols of the class $RR'B_{10}H_8[C(CH_2OH)]_2$, wherein R and R' are each hydrogen or an alkyl group containing from 1 to 5 carbon atoms.

Organoboron alcohols of the class $$RR'B_{10}H_8[C(CH_2OH)]_2$$

wherein R and R' are hydrogen or an alkyl group containing from 1 to 5 carbon atoms, can be prepared according to the method described in application Serial No. 801,960, filed March 25, 1959, of John W. Ager, Jr., et al. For example, the compound $B_{10}H_{10}[C(CH_2OH)]_2$ can be prepared by hydrolyzing the compound $$B_{10}H_{10}[C(CH_2O\overset{O}{\overset{\|}{C}}CH_3)C(CH_2O\overset{O}{\overset{\|}{C}}CH_3)]$$

with a methanolic solution of potassium hydroxide at room temperature for about 4 hours followed by heating at 60° C. for about 20 minutes. On acidification of the reaction mixture the product $(B_{10}H_{10}[C(CH_2OH)]_2)$ precipitates and it is then recovered by filtration.

The solid products prepared in accordance with the method of this invention, when incorporated with suitable oxidizers, such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers, are capable of being formed into a wide variety of grains, tablets, and sheets, all with desirable mechanical and chemical properties. Propellants produced by the method described in this application burn uniformly without disintegration on ignition by conventional means, such as a pyrotechnic type igniter, and are mechanically strong enough to stand ordinary handling.

In accordance with this invention, it was discovered that organoboron alcohols of the class $$RR'B_{10}H_8[C(CH_2OH)]_2$$

wherein R and R' are hydrogen or alkyl group containing from 1 to 5 carbon atoms, will dehydrate in the presence of an inorganic acid dehydrating agent to produce an organoboron cyclic ether. Suitable inorganic acid dehydrating agents include sulfuric acid having a concentration greater than 70 percent by weight and phosphoric acid having a concentration greater than 70 percent by weight.

The ratio of the reactants in the dehydration of organoboron alcohols of the above class with an inorganic acid can vary widely, provided sufficient inorganic acid is present to accomplish dehydration, generally being within the range of from about 0.5 to 25 moles of inorganic acid per mole of organoboron alcohol employed and preferably within the range of from about 5 to 20 moles of inorganic acid per mole of the organoboron alcohol. The temperature of the reaction can also be varied widely from about 50° C. to about 300° C. depending upon the particular acid employed and upon the strength of the acid. Generally, the reaction requires from about 0.1 to 10 hours or more, depending upon the particular reactants and the temperature and pressure employed.

The process of the invention is illustrated in detail by the following example, which is to be considered not limitative.

Example I

A total of 5.8 grams of $B_{10}H_{10}[C(CH_2OH)]_2$ and 50 ml. of concentrated sulfuric acid (98 percent by weight) were placed in a sublimation apparatus and heated under vacuum at 110° C. for 6 hours. The sublimate was dissolved in pentane, separated from the insoluble material and dried over magnesium sulfate. After filtering, the solvent was removed and the residue was re-sublimed yielding 4.4 grams of a white solid which was identified by mass spectrometric analysis and by nuclear magnetic resonance spectrum determinations as

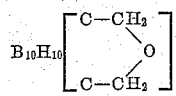

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter admixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this, the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The compound of the formula

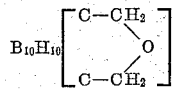

prepared as described in Example I has the same structural formula as structural formula I shown in FIGURE 1 with the exception that the hydrogen atoms indicated by the single and double asterisk are replaced by the radical

What is claimed is:

1. An ether of the formula:

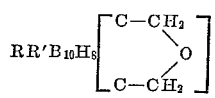

wherein R and R' are selected from the group consisting of hydrogen and an alkyl group having from 1 to 5 carbon atoms.

2. 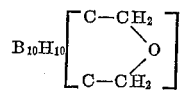

References Cited in the file of this patent
UNITED STATES PATENTS

| | | |
|---|---|---|
| 2,462,048 | Wyler | Feb. 15, 1949 |
| 2,468,722 | Wyler | Apr. 26, 1949 |
| 2,495,305 | Wyler | Jan. 24, 1950 |
| 3,000,901 | Wyler | Sept. 19, 1961 |
| 3,006,926 | Case et al. | Oct. 31, 1961 |